(12) United States Patent
Podgorny et al.

(10) Patent No.: US 10,366,349 B1
(45) Date of Patent: Jul. 30, 2019

(54) QUESTION PRIORITIZATION IN COMMUNITY-DRIVEN QUESTION-AND-ANSWER SYSTEMS

(75) Inventors: Igor A. Podgorny, San Diego, CA (US); Fedor N. Dzegilenko, San Jose, CA (US); Martha J. Fiske, Poway, CA (US); Jason A. Greschler, San Diego, CA (US); Floyd J. Morgan, Carlsbad, CA (US)

(73) Assignee: INTUIT INC., Mountain View, CA (US)

( * ) Notice: Subject to any disclaimer, the term of this patent is extended or adjusted under 35 U.S.C. 154(b) by 668 days.

(21) Appl. No.: 12/841,821

(22) Filed: Jul. 22, 2010

(51) Int. Cl.
| | | |
|---|---|---|
| *G06Q 10/00* | (2012.01) | |
| *G06Q 50/00* | (2012.01) | |
| *G06Q 40/00* | (2012.01) | |
| *G06Q 30/00* | (2012.01) | |
| *G06F 16/00* | (2019.01) | |

(52) U.S. Cl.
CPC ............. *G06Q 10/00* (2013.01); *G06F 16/00* (2019.01); *G06Q 30/00* (2013.01); *G06Q 40/00* (2013.01); *G06Q 50/00* (2013.01)

(58) Field of Classification Search
CPC ............................... G06Q 30/00; G06Q 10/00
USPC ......................................................... 705/1.1
See application file for complete search history.

(56) References Cited

U.S. PATENT DOCUMENTS

| | | | | |
|---|---|---|---|---|
| 6,064,978 | A   * | 5/2000  | Gardner et al. | 705/7.32 |
| 6,631,377 | B2 * | 10/2003 | Kuzumaki | 434/322 |
| 2002/0143661 | A1 * | 10/2002 | Tumulty et al. | 705/27 |
| 2003/0179876 | A1 * | 9/2003  | Fox | H04M 3/51 379/265.02 |
| 2008/0040427 | A1 * | 2/2008  | Shroff et al. | 709/204 |
| 2008/0294637 | A1 * | 11/2008 | Liu | 707/6 |
| 2009/0234710 | A1 * | 9/2009  | Hassine et al. | 705/10 |
| 2010/0073373 | A1 * | 3/2010  | Groff et al. | 345/440 |

* cited by examiner

*Primary Examiner* — Sangeeta Bahl
(74) *Attorney, Agent, or Firm* — Patterson + Sheridan, LLP

(57) ABSTRACT

Some embodiments provide a system that facilitates use of a question-and-answer system. During operation, the system determines a business value of a question submitted by a first user to the question-and-answer system. Next, the system prioritizes answering of the question by a second user in the question-and-answer system based on the business value.

15 Claims, 4 Drawing Sheets

FIG. 2

QUESTION PRIORITIZATION IN COMMUNITY-DRIVEN QUESTION-AND-ANSWER SYSTEMS

RELATED APPLICATION

The subject matter of this application is related to the subject matter in a co-pending non-provisional application by inventors Igor A. Podgorny, Fedor N. Dzegilenko, Floyd J. Morgan, Vineet Singh, Marc J. Attinasi and Troy D. Otillio and filed on the same day as the instant application entitled "Real-Time User Behavior Prediction," having Ser. No. 12/841,831, and filed on 22 Jul. 2010.

The subject matter of this application is also related to the subject matter in a co-pending non-provisional application by inventors Marc J. Attinasi, Igor A. Podgorny, Fedor N. Dzegilenko, Floyd J. Morgan, Vineet Singh and Troy D. Otillio and filed on the same day as the instant application entitled "Real-Time Tracking of User-Application Interaction," having serial number Ser. No. 12/841,838, and filed on 22 Jul. 2010.

BACKGROUND

Related Art

The present embodiments relate to question-and-answer (Q&A) systems. More specifically, the present embodiments relate to techniques for prioritizing the answering of questions in a Q&A system.

Q&A systems may allow communities of users to ask questions and/or provide answers to the questions. For example, a Q&A website may provide webpages that allow users to post questions, view the questions, answer the questions, rate the questions and/or answers, and/or add comments to the questions and/or answers. In addition, Q&A systems may be used to collect information of varying generality and/or specificity. For example, a general Q&A system may allow users to ask any question as long as the question adheres to behavioral guidelines for the Q&A system. Conversely, a more specific Q&A system may restrict questions and answers to those that pertain to a specific domain, such as an academic field, a hobby or interest, and/or a commercial product.

In addition, the success and/or effectiveness of a Q&A system may depend on the user base, the quality of questions and answers, and/or the motivation of users in the Q&A system. First, as with other community-driven systems, use of the Q&A system may be sustained only after the Q&A system is utilized by a critical mass of users. Along the same lines, the roles taken on by the users may affect the dynamic of the Q&A system. For example, the frequency with which each user asks and answers questions may affect the rate at which useful information is collected by the Q&A system.

Next, the Q&A system may provide useful information only if the questions and/or answers are intelligible, accurate, and relevant. For example, a user may be discouraged from using the Q&A system if answers to his/her questions tend to be of low quality and/or are difficult to understand. Conversely, a user may not answer a question if the user cannot understand the question and/or if the question is not relevant to the topics associated with the Q&A system.

Finally, the effectiveness of the Q&A system may depend on the ability to encourage user participation in the Q&A system. Moreover, user participation may be increased only if the users' motivations for using the Q&A system are effectively targeted. For example, monetary compensation for answering questions in the Q&A system may lead to a decrease in the quality of answers because users who provide the best answers in the Q&A system are typically motivated by a sense of altruism or community rather than financial gain.

Hence, Q&A systems may be improved by mechanisms that increase the quality and relevance of questions and answers and/or encourage positive user behavior among users of the Q&A systems.

SUMMARY

Some embodiments provide a system that facilitates use of a question-and-answer system. During operation, the system determines a business value of a question submitted by a first user to the question-and-answer system. Next, the system prioritizes answering of the question by a second user in the question-and-answer system based on the business value.

In some embodiments, the system further prioritizes answering of the question by the second user based on a community value of the question.

In some embodiments, the community value is associated with at least one of:
  (i) a user reputation of the first user;
  (ii) a popularity of the question;
  (iii) a participation rate of the first user in the question-and-answer system; and
  (iv) a recentness of the question.

In some embodiments, answering of the question is prioritized based on the community value if the second user is a voluntary participant in the question-and-answer system.

In some embodiments, determining the business value of the question involves determining a change in probability of a user action from the first user caused by answering of the question, and multiplying the change in probability by a price associated with the user action.

In some embodiments, the user action is at least one of adoption of a product associated with the question-and-answer system and use of technical support for the product.

In some embodiments, prioritizing answering of the question by the second user based on the business value involves at least one of ordering the question within a list of questions displayed to the second user, and assigning a point value to the question based on the business value.

In some embodiments, the first user and the second user are at least one of a voluntary participant in the question-and-answer system, a user of a product associated with the question-and-answer system, and an employee of a company associated with the product.

BRIEF DESCRIPTION OF THE FIGURES

FIG. 2 shows an exemplary screenshot in accordance with an embodiment.

In the figures, like reference numerals refer to the same figure elements.

DETAILED DESCRIPTION

Figure 1:
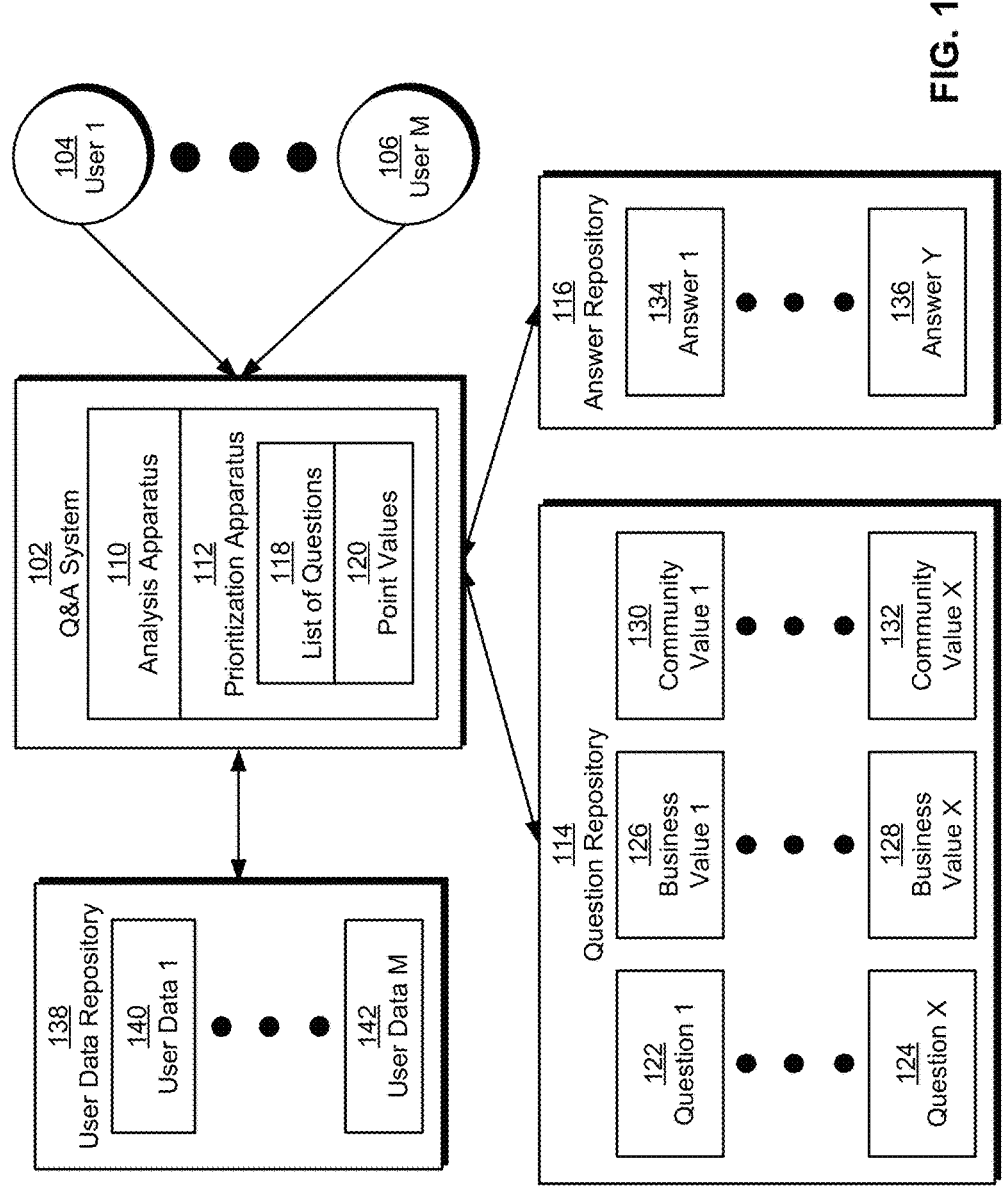
FIG. 1 shows the operation of a question-and-answer (Q&A) system in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Embodiments provide a method and system for facilitating use of a question-and-answer (Q&A) system. The Q&A system may allow a community of users to submit and/or answer questions in a centralized forum. The Q&A system may also be associated with a specific field and/or product such as a software application. For example, the Q&A system may allow users to submit and/or answer questions related to tax preparation and/or a tax-preparation application.

More specifically, embodiments provide a method and system for prioritizing the answering of questions in a Q&A system. First, a business value of each question submitted to the Q&A system may be determined. The business value may correspond to the change in probability of a user action caused by answering of the question multiplied by a price associated with the user action. For example, if answering a user's question increases the user's likelihood of adopting a product associated with the Q&A system by 10% and the product costs $100, the business value of the question may be $10.

A community value of the question may also be determined. The community value may be based on the user's reputation, the question's popularity, the user's participation rate in the Q&A system, and/or a recentness of the question. For example, the question's community value may be higher if the user is an active participant in the Q&A system and/or the question is frequently viewed and/or commented on.

Finally, answering of the question may be prioritized based on the business value and/or community value. For example, the question may be placed higher in a list of questions displayed to other users of the Q&A system if the question has higher business and/or community value. The question may also include a point value that corresponds to the question's business and/or community value. The ordering and/or point value of each question may thus encourage the users of the Q&A system to answer questions in order of business and/or community value.

FIG. 1 shows the operation of a question-and-answer (Q&A) system in accordance with an embodiment. Q&A system 102 may be accessed and/or used by a set of users (e.g., user 1 104, user m 106). For example, Q&A system 102 may provide a user interface (e.g., graphical user interface (GUI), web-based user interface, etc.) that allows the users to create user accounts, submit questions, view the questions, add comments to the questions, answer the questions, and/or rate the questions or answers. User account information for each user, such as a login, encrypted password, personal information (e.g., name, age, location, email address, etc.), and/or other information related to use of Q&A system 102 by the user, may be stored as user data (e.g., user data 1 140, user data m 142) in a user data repository 138. Along the same lines, questions (e.g., question 1 122, question x 124) submitted by the users may be stored in a question repository 114, and answers (e.g., answer 1 134, answer y 136) to the questions may be stored in an answer repository 116.

In one or more embodiments, Q&A system 102 is implemented using a client-server architecture. More specifically, Q&A system 102 may be executed on one or more servers. In addition, Q&A system 102 may be accessed from other machines using a web browser and network connection. In other words, Q&A system 102 may be implemented using a cloud computing system that is accessed over the Internet. Alternatively, some of Q&A system 102 may be locally installed on a computing system, such as a personal computer (PC), laptop computer, mobile phone, personal digital assistant (PDA), and/or other digital computing devices used by the users. For example, Q&A system 102 may include one or more servers and an application that is installed on the users' computing systems. The users may provide user data, questions, answers, and/or other data associated with Q&A system 102 through instances of the application, which transmit the data to the servers. The data may then be stored in one or more relational databases on the servers.

In addition, Q&A system 102 may facilitate the users' understanding of a specific field (e.g., topic, subject, category, etc.) and/or product (e.g., software, consumer products, services, etc.) by allowing the users to submit questions and answers related to the field and/or product. In other words, Q&A system 102 may provide a mechanism through which the users may obtain and/or give help or support for the field and/or product by interacting with one another. For example, Q&A system 102 may allow users of a tax-preparation application to ask and answer questions related to tax preparation and/or the tax-preparation application.

In turn, interaction among users of Q&A system 102 may promote user activity within the corresponding field and/or product. Using the example above, users of Q&A system 102 may submit questions about user issues with the tax-preparation application to Q&A system 102 and receive answers that allow the user issues to be resolved. As a result, users of Q&A system 102 may be more likely to adopt and/or continue using the tax-preparation application than non-users of Q&A system 102.

The functionality of Q&A system 102 may also be driven by a sense of community among the users. For example, Q&A system 102 may include a number of voluntary participants who answer questions for reasons of altruism, giving back, and/or interaction with other users rather than monetary gain. A voluntary participant may thus answer questions submitted to Q&A system 102 to bolster his/her reputation or prominence in Q&A system 102 and/or to connect with other users of Q&A system 102. For example, the voluntary participant may seek to increase a point total associated with his/her user account in Q&A system 102 and/or reach a "SuperUser" status in Q&A system 102 by answering questions clearly, thoughtfully, and/or thoroughly.

In one or more embodiments, Q&A system 102 includes functionality to prioritize the answering of questions by the users in a way that facilitates both business-oriented and community-oriented use of Q&A system 102. As shown in FIG. 1, Q&A system 102 includes an analysis apparatus 110 and a prioritization apparatus 112.

First, analysis apparatus 110 may determine a business value (e.g., business value 1 126, business value x 128) of each question submitted to Q&A system 102. The business value may correspond to a conditional expectation of revenue and/or cost savings from a first user submitting the question given the answering of the question by a second user. In particular, the business value may be calculated by determining a change in probability of a user action from the first user caused by answering of the question by the second user and multiplying the change in probability by a price associated with the user action. Furthermore, the user action may be adoption of the product associated with Q&A system 102 and/or use of technical support for the product. The business value may then be stored in question repository 114 and linked to the corresponding question.

For example, if the product costs $50 and answering of the question increases the first user's likelihood of adopting the product from 10% to 60%, the business value of the question may be $25, which is obtained by multiplying the increase in likelihood of adoption (e.g., 50%) by the cost of the product (e.g., $50). Similarly, if technical support costs for the product average $10 per user issue and answering of the question decreases the first user's likelihood of using technical support from 50% to 30%, the business value of the question may be $2, or the decrease in likelihood of using technical support (e.g., 20%) multiplied by the cost of technical support (e.g., $10).

In one or more embodiments, the change in probability of the user action is obtained by monitoring user of the product by the users and using a predictive model to assess the probability of the user action given use of the product with and without answering of the question. Monitoring product use is discussed in a co-pending non-provisional application by inventors Marc Attinasi, Igor A. Podgorny, Fedor Dzegilenko, Floyd Morgan, Vineet Singh and Troy Otillio and filed on the same day as the instant application entitled "Real-Time Tracking of User-Application Interaction," having Ser. No. 12/841,838, and filing date Jul. 22, 2010, which is incorporated herein by reference. Probabilistic user behavior analysis using a predictive model is discussed in a co-pending non-provisional application by inventors Igor A. Podgorny, Fedor Dzegilenko, Floyd Morgan, Vineet Singh, Marc Attinasi and Troy Otillio and filed on the same day as the instant application entitled "Real-Time User Behavior Prediction" having Ser. No. 12/841,831, and filing date Jul. 22, 2010, which is incorporated herein by reference.

Prioritization apparatus 112 may then prioritize answering of the question by the second user based on the business value of the question. In particular, prioritization apparatus 112 may order a list of questions 118 displayed to the second user and/or assign point values 120 to the questions based on the questions' respective business values. For example, a question with a high business value may be ordered near the top of the list and/or given a high point value to encourage answering of the question by other users.

Moreover, analysis apparatus 110 and prioritization apparatus 112 may enable the prioritization of questions submitted to Q&A system 102 based on the community value (e.g., community value 1 130, community value x 132) of each question. As mentioned previously, the amount and/or quality of information (e.g., questions and answers) collected by Q&A system 102 may be driven by a sense of community among users of Q&A system 102. Consequently, prioritization of questions by community value may further the sense of community, which in turn may increase the usefulness and/or quality of Q&A system 102.

In one or more embodiments, the community value of a question submitted by a user is associated with a user reputation of the user, a popularity of the question, a participation rate of the user in Q&A system 102, and/or a recentness of the question. As with the question's business value, the community value may influence the question's place in a list (e.g., list of questions 118) and/or point value (e.g., point values 120) in Q&A system 102. For example, a question submitted by a prominent and/or active user may be placed near the top of a list of questions displayed to other users (e.g., through a user interface). Similarly, a question with a large number of views and/or comments may be assigned a higher point value than questions with fewer views and/or comments. Prioritization of questions by business and/or community value is discussed in further detail below with respect to FIG. 2.

Because Q&A system 102 may be designed to facilitate use of a product (e.g., application), Q&A system 102 may include multiple types of users: voluntary participants, users of the product, and/or employees of a company associated with the product. Furthermore, Q&A system 102 may encourage participation in Q&A system 102 across all types of users by prioritizing questions differently for different types of users. For example, prioritization apparatus 112 may prioritize questions for voluntary participants based on both business and community value to facilitate interaction that is meaningful to the voluntary participants. On the other hand, prioritization apparatus 112 may prioritize questions for employees of the company based primarily or solely on business value so that the employees may facilitate adoption of the product and/or reduce costs associated with maintenance of and/or support for the product.

Figure 2:
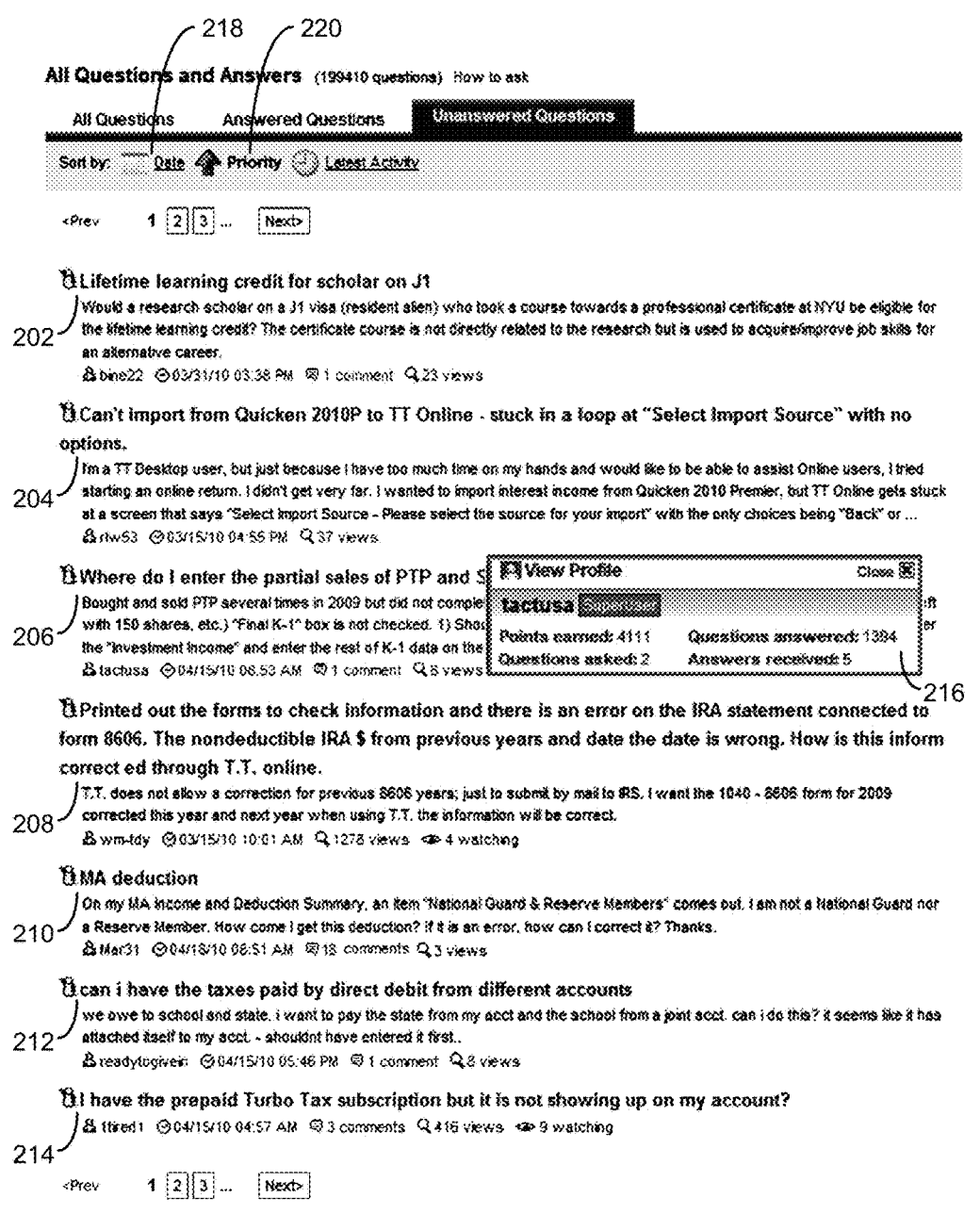

FIG. 2 shows an exemplary screenshot in accordance with an embodiment. More specifically, FIG. 2 shows a screenshot of a user interface for a Q&A system, such as Q&A system 102 of FIG. 1. The user interface may be provided by a webpage within a web browser and/or by an application that is locally installed on a computing system. In addition, the user interface may allow a user to ask and/or answer questions related to the subject of tax preparation and/or the use of a specific accounting or tax-preparation application.

As shown in FIG. 2, the user interface includes a list of questions 202-214 submitted by users of the Q&A system. Questions 202-214 may be prioritized based on a business value and/or community value associated with each question. For example, questions 202-214 may be displayed as shown in FIG. 2 if a user selects an element 220 (e.g., "Priority") to view questions submitted to the Q&A system in order of priority. Because questions 202-214 are displayed on the first of multiple pages in the user interface, questions 202-214 may correspond to high-priority questions. Alternatively, questions 202-214 and/or other questions in the Q&A system may be displayed in ascending and/or descending order of recentness if the user selects a different element 218 (e.g., "Date") in the user interface.

As described above, questions with a higher business value may be given higher priority than other questions in the Q&A system. For example, questions 202-204 may be placed at the top of the user interface because answering either question may significantly increase the probability that the corresponding user adopts the accounting or tax-preparation application and/or decrease the user's likelihood of using technical support for the accounting or tax-preparation application. In other words, answering of questions 202-204 may increase revenue for the company selling the application and/or decrease costs associated with technical support for the application.

Next, the high priority of question 206 may be based on the user reputation and/or participation rate of the corresponding user. In particular, user data 216 for the user indicates that the user answers far more questions (e.g., 1394) than he/she submits (e.g., 2), is associated with a high point total (e.g., 4111), and has "SuperUser" status. As a result, the user's participation in the Q&A system may add value to the Q&A system. Moreover, continued use of the Q&A system by the user may be facilitated by encouraging other users to answer question 206.

On the other hand, the popularity of questions 208-210 may trigger the prioritization of questions 208-210. Question 208 has a large number of views (e.g., 1278) and users who have added question 208 to personal watch lists (e.g., 4), while question 210 includes multiple (e.g., 18) comments. Such popularity may indicate that many users are interested in the answers to questions 208-210, thus corresponding to a significant amount of community value for questions 208-210.

Question 212 may be prioritized because question 212 may be submitted by a user who has spent a lot of time viewing existing questions and answers in the Q&A system and/or who is an active participant in the Q&A system. For example, question 212 may be placed on the first page of questions because the user frequently provides ratings and/or comments on other users' questions and/or answers, or because the user has searched extensively for other questions or answers related to question 212.

Finally, the recentness (e.g., "4/15/10 04:57 AM") and/or popularity of question 214 (e.g., "416 views") may give question 214 a high priority. Moreover, as question 214 becomes less recent, question 214 may be placed further down in the list of questions. For example, the user interface may display question 214 on the second or third page of questions a week after question 214 is submitted to the Q&A system.

Figure 3:
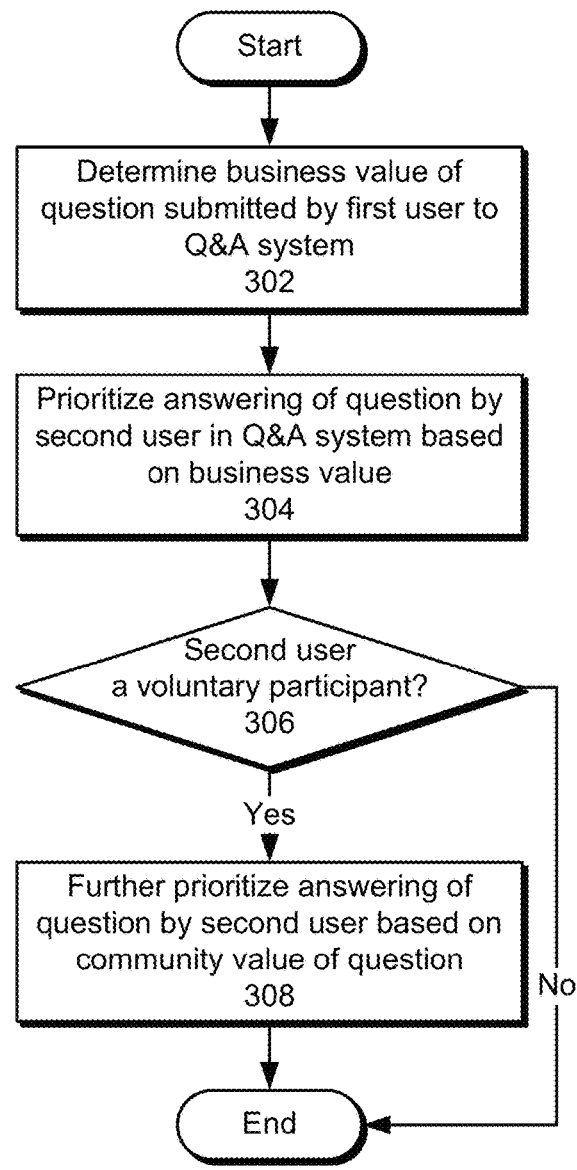
FIG. 3 shows a flowchart illustrating the process of facilitating use of a question-and-answer system in accordance with an embodiment.

FIG. 3 shows a flowchart illustrating the process of facilitating use of a Q&A system in accordance with an embodiment. In one or more embodiments, one or more of the steps may be omitted, repeated, and/or performed in a different order. Accordingly, the specific arrangement of steps shown in FIG. 3 should not be construed as limiting the scope of the embodiments.

First, a business value of a question submitted by a first user to the Q&A system is determined (operation 302). The business value may correspond to the expected increase in revenue and/or reduction in costs associated with answering the question. The business value may be obtained by determining a change in probability of a user action from the first user caused by answering of the question and multiplying the change in probability by a price associated with the user action. As a result, the question may be associated with a high business value if the answer significantly changes the user's likelihood of either adopting a product (e.g., application, consumer device, service, etc.) associated with the Q&A system or using technical support for the product. Conversely, the question may be associated with a low business value if the answer makes little to no difference in the user's subsequent behavior regarding the product, or if the answer dissuades the user from using the product.

Next, answering of the question by a second user in the Q&A system is prioritized based on the business value (operation 304). The prioritization may be carried out by ordering the question within a list of questions displayed to the second user and/or assigning a point value to the question based on the business value.

Additional prioritization of the question may be made if the second user is a voluntary participant (operation 306) in the Q&A system. In particular, answering of the question by the second user may be further prioritized based on a community value of the question (operation 308) if the second user is a voluntary participant. The community value of the question may be based on a user reputation of the first user, a popularity of the question, a participation rate of the first user in the Q&A system, and/or a recentness of the question. Moreover, such prioritization by community value may facilitate a connection and/or sense of community between the second user and other users of the Q&A system. For example, the question may be prioritized by community value to allow the second user to increase his/her user reputation (e.g., point total, user status, etc.) in the Q&A system and/or engage in rewarding interaction with the other users.

On the other hand, the question may be prioritized primarily and/or solely by business value if the second user is not a voluntary participant in the Q&A system. For example, the question may be prioritized only by business value if the second user is an employee of a company associated with (e.g., selling) the product to facilitate the answering of questions that increase revenue and/or decrease costs associated with the product.

Figure 4:
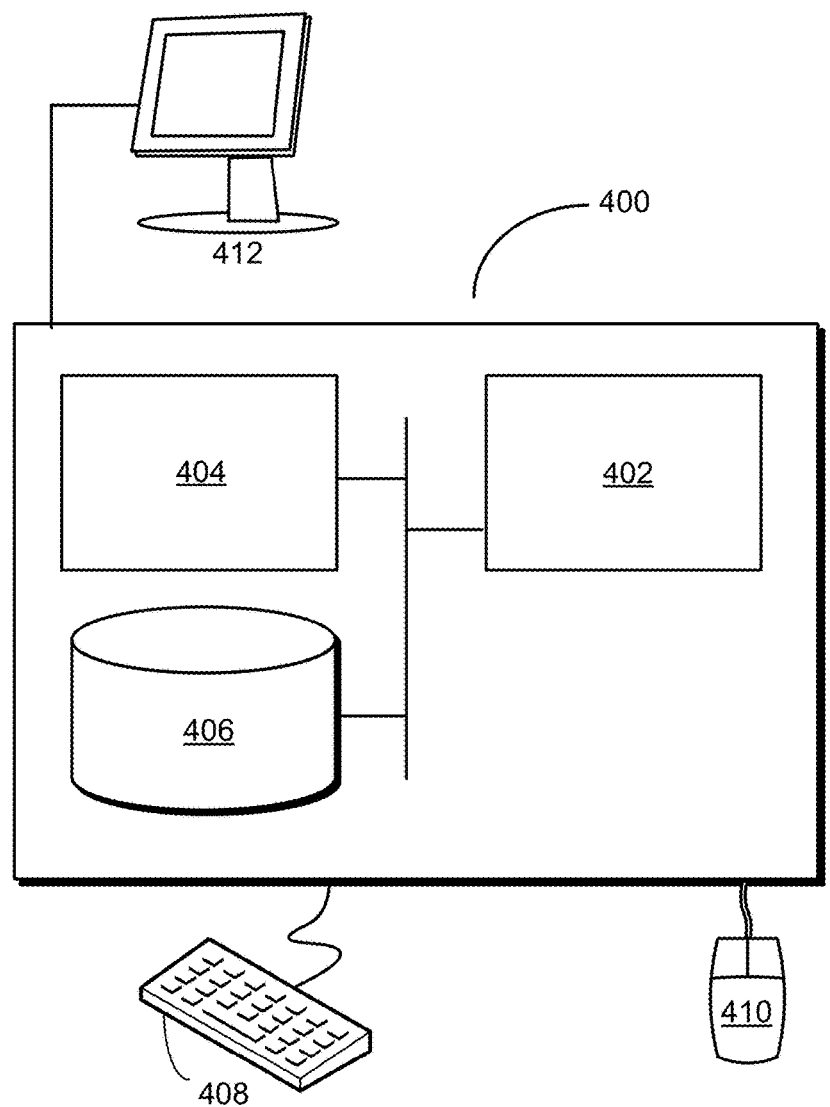
FIG. 4 shows a computer system in accordance with an embodiment.

FIG. 4 shows a computer system 400. Computer system 400 includes a processor 402, memory 404, storage 406, and/or other components found in electronic computing devices. Processor 402 may support parallel processing and/or multi-threaded operation with other processors in computer system 400. Computer system 400 may also include input/output (I/O) devices such as a keyboard 408, a mouse 410, and a display 412.

Computer system 400 may include functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications may obtain the use of hardware resources on computer system 400 from the operating system, as well as interact with the user through a hardware and/or software framework provided by the operating system.

In particular, computer system 400 may provide a Q&A system for a community of users. The Q&A system may include an analysis apparatus that determines a business value and/or a community value of a question submitted by a first user. The Q&A system may also include a prioritization apparatus that prioritizes answering of the question by a second user based on the business value and/or community value. For example, the prioritization apparatus may prioritize answering of the question by ordering the question within a list of questions displayed to the second user and/or assigning a point value to the question based on the business value.

In addition, one or more components of computer system 400 may be remotely located and connected to the other components over a network. Portions of the present embodiments (e.g., analysis apparatus, prioritization apparatus, etc.) may also be located on different nodes of a distributed system that implements the embodiments. For example, the present embodiments may be implemented using a cloud computing system that provides a web-based Q&A system for a product that is used by the users.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating use of a web-based question-and-answer (Q&A) system, comprising:
   providing a user-interface for an application associated with the web-based Q&A system to a first computer and to one or more second computers for installation on the first computer and the one or more second computers;
   receiving, at a transmission server of the web-based Q&A system, a first question submitted by a first user at the first computer using the user-interface to the Q&A system, wherein the transmission server comprises a processor and a memory, and wherein the first question is associated with a product;
   accessing a partitioned data section of the memory associated with a list of other questions, each other question in the list of other questions associated with a business value;
   determining a business value of the first question by:
      using a predictive model to determine, based on probabilistic user behavior analysis, a change in a probability of a user action caused by answering the first question, wherein:
         the predictive model has been trained based on activity histories of a plurality of users comprising interactions between given users of the plurality of users and the web-based Q&A system related to answering questions;
         the first question is provided as an input to the predictive model;
         the change in the probability of the user action is determined based on probabilities of the user action with and without answering of the first question; and
         the user action is associated with one of the following:
            a use of technical support for the product; or
            an adoption of the product; and
      multiplying the determined change in the probability by one of the following:
         a cost of technical support related to the first question; or
         a cost of the product;
   generating, by a processor, a list of questions for display to a set of other users of the web-based Q&A system, wherein each of the other users are different from the first user, wherein the first question is added to the accessed list of other questions, wherein the generated list of questions includes each question in the accessed list of questions, and wherein each respective question in the generated list of questions is associated with a respective business value;
   storing the generated list of questions in a partitioned data section of the memory associated with the generated list of questions;
   determining that a second user in the set of other users is an employee of a company associated with the product based on user account information of the second user;
   in response to determining that the second user is an employee of the company, prioritizing the generated list of questions for display to the second user based on the respective business value for each respective question in the generated list of questions such that questions in the generated list of questions that have a higher business value are displayed before questions in the generated list of questions that have a lower business value;
   transmitting, over a data channel, the prioritized list of questions to at least one of the one or more second computers, wherein the at least one of the one or more second computers is associated with the second user;
   activating a display of the prioritized list of questions at the user-interface on the at least one of the one or more second computers to the second user; and
   upon receiving an answer to one or more of the questions in the prioritized list of questions, storing the answer in a partitioned data section of the memory associated with an answer repository.

2. The computer-implemented method of claim 1, wherein the generated list of questions is prioritized based on a recentness of each question in the generated list of questions.

3. The computer-implemented method of claim 1, wherein the user action is further associated with an adoption of the product by the first user, wherein the product is associated with the Q&A system.

4. The computer-implemented method of claim 1, wherein prioritizing the list of questions for display to the second user based on the business value involves at least one of:
   ordering the first question within a list of questions displayed to the second user; and
   assigning a point value to the first question based on the business value.

5. The computer-implemented method of claim 1, wherein the first user is a voluntary participant in the Q&A system and a user of the product, wherein the product is associated with the Q&A system, and wherein the second user is an employee of the company associated with the product.

6. A computer system for facilitating use of a web-based question-and-answer (Q&A) system, comprising:
   a processor; and
   a memory comprising instructions that, when executed by the processor, cause the processor to perform a method, the method comprising:
      providing a user-interface for an application associated with the web-based Q&A system to a first computer and to one or more second computers for installation on the first computer and the one or more second computers;
      receiving, at a transmission server of the web-based Q&A system, a first question submitted by a first user at the first computer using the user-interface to the Q&A system, wherein the transmission server comprises a processor and a memory, and wherein the first question is associated with a product;

accessing a partitioned data section of the memory associated with a list of other questions, each other question in the list of other questions associated with a business value, determining a business value of the first question by:
  using a predictive model to determine, based on probabilistic user behavior analysis, a change in a probability of a user action caused by answering the first question, wherein:
    the predictive model has been trained based on activity histories of a plurality of users comprising interactions between given users of the plurality of users and the web-based Q&A system related to answering questions;
    the first question is provided as an input to the predictive model;
    the change in the probability of the user action is determined based on probabilities of the user action with and without answering of the first question; and
    the user action is associated with one of the following:
      a use of technical support for the product; or
      an adoption of the product; and
  multiplying the determined change in the probability by one of the following:
    a cost of technical support related to the first question; or
    a cost of the product;

generating, by a processor, a list of questions for display to a set of other users of the web-based Q&A system, wherein each of the other users are different from the first user, wherein the first question is added to the accessed list of other questions, wherein the generated list of questions includes each question in the accessed list of questions, and wherein each respective question in the generated list of questions is associated with a respective business value;

storing the generated list of questions in a partitioned data section of the memory associated with the generated list of questions;

determining that a second user in the set of other users is an employee of a company associated with the product based on user account information of the second user;

in response to determining that the second user is an employee of the company, prioritizing the generated list of questions for display to the second user based on the respective business value for each respective question in the generated list of questions such that questions in the generated list of questions that have a higher business value are displayed before questions in the generated list of questions that have a lower business value;

transmitting, over a data channel, the prioritized list of questions to at least one of the one or more second computers, wherein the at least one of the one or more second computers is associated with the second user;

activating a display of the prioritized list of questions at the user-interface on the at least one of the one or more second computers to the second user; and upon receiving an answer to one or more of the questions in the prioritized list of questions, storing the answer in a partitioned data section of the memory associated with an answer repository.

7. The system of claim 6, wherein the generated list of questions is prioritized based on a recentness of each question in the generated list of questions.

8. The system of claim 6, wherein the user action is further associated with an adoption of the product by the first user, and wherein the product is associated with the Q&A system.

9. The system of claim 6, wherein prioritizing the list of questions for display to the second user based on the business value involves at least one of:
  ordering the first question within a list of questions displayed to the second user; and
  assigning a point value to the first question based on the business value.

10. The system of claim 6, wherein the first user is a voluntary participant in the Q&A system and a user of the product, wherein the product is associated with the Q&A system, and the second user is an employee of the company associated with the product.

11. A non-transitory computer-readable storage medium storing instructions that when executed by a computer cause the computer to perform a method for facilitating use of a web-based question-and-answer (Q&A) system, the method comprising:
  providing a user-interface for an application associated with the web-based Q&A system to a first computer and to one or more second computers for installation on the first computer and the one or more second computers;
  receiving, at a transmission server of the web-based Q&A system, a first question submitted by a first user at the first computer using the user-interface to the Q&A system, wherein the transmission server comprises a processor and a memory, and wherein the first question is associated with a product;
  accessing a partitioned data section of the memory associated with a list of other questions, each other question in the list of other questions associated with a business value,
  determining a business value of the first question by:
    using a predictive model to determine, based on probabilistic user behavior analysis, a change in a probability of a user action caused by answering the first question, wherein:
      the predictive model has been trained based on activity histories of a plurality of users comprising interactions between given users of the plurality of users and the web-based Q&A system related to answering questions;
      the first question is provided as an input to the predictive model;
      the change in the probability of the user action is determined based on probabilities of the user action with and without answering of the first question; and
      the user action is associated with one of the following:
        a use of technical support for the product; or
        an adoption of the product; and
    multiplying the determined change in the probability by one of the following:
      a cost of technical support related to the first question; or
      a cost of the product;

generating, by a processor, a list of questions for display to a set of other users of the web-based Q&A system, wherein each of the other users are different from the first user, wherein the first question is added to the accessed list of other questions, wherein the generated list of questions includes each question in the accessed list of questions, and wherein each respective question in the generated list of questions is associated with a respective business value;

storing the generated list of questions in a partitioned data section of the memory associated with the generated list of questions;

determining that a second user in the set of other users is an employee of a company associated with the product based on user account information of the second user;

in response to determining that the second user is an employee of the company, prioritizing the generated list of questions for display to the second user based on the respective business value for each respective question in the generated list of questions such that questions in the generated list of questions that have a higher business value are displayed before questions in the generated list of questions that have a lower business value;

transmitting, over a data channel, the prioritized list of questions to at least one of the one or more second computers, wherein the at least one of the one or more second computers is associated with the second user;

activating a display of the prioritized list of questions at the user-interface on the at least one of the one or more second computers to the second user; and upon receiving an answer to one or more of the questions in the prioritized list of questions, storing the answer in a partitioned data section of the memory associated with an answer repository.

12. The non-transitory computer-readable storage medium of claim 11, wherein the generated list of questions is prioritized based on a recentness of each question in the generated list of questions.

13. The non-transitory computer-readable storage medium of claim 11, wherein the user action is further associated with an adoption of the product by the first user, wherein the product is associated with the Q&A system.

14. The non-transitory computer-readable storage medium of claim 11, wherein prioritizing the list of questions for display to the second user based on the business value involves at least one of:

ordering the first question within a list of questions displayed to the second user; and assigning a point value to the first question based on the business value.

15. The non-transitory computer-readable storage medium of claim 11, wherein the first user is a voluntary participant in the Q&A system and a user of the product, wherein the product is associated with the Q&A system, and the second user is an employee of the company associated with the product.

* * * * *